(12) United States Patent
Mustakangas et al.

(10) Patent No.: US 12,434,176 B2
(45) Date of Patent: Oct. 7, 2025

(54) FILTER DIAPHRAGM FOR A HORIZONTAL PLATE AND FRAME-TYPE FILTER, SUCH AS A TOWER PRESS

(71) Applicant: Metso Outotec Finland Oy, Tampere (FI)

(72) Inventors: Mirva Mustakangas, Pirkkala (FI); Ismo Juvonen, Rauha (FI); Janne Kaipainen, Halsua (FI); Teemu Eloranta, Luumäki (FI); Mika Illi, Vantaa (FI); Kari Vänttinen, Espoo (FI)

(73) Assignee: Metso Finland Oy, Espoo (FI)

( * ) Notice: Subject to any disclaimer, the term of this patent is extended or adjusted under 35 U.S.C. 154(b) by 325 days.

(21) Appl. No.: 17/792,850

(22) PCT Filed: Apr. 17, 2020

(86) PCT No.: PCT/FI2020/050254
§ 371 (c)(1),
(2) Date: Jul. 14, 2022

(87) PCT Pub. No.: WO2021/209679
PCT Pub. Date: Oct. 21, 2021

(65) Prior Publication Data
US 2023/0043237 A1     Feb. 9, 2023

(51) Int. Cl.
*B01D 25/28*     (2006.01)
*B01D 25/164*    (2006.01)
(Continued)

(52) U.S. Cl.
CPC ......... *B01D 25/285* (2013.01); *B01D 25/164* (2013.01); *B01D 25/215* (2013.01); *B01D 35/14* (2013.01); *B01D 2201/34* (2013.01)

(58) Field of Classification Search
CPC .. B01D 25/285; B01D 25/164; B01D 25/215; B01D 35/14; B01D 2201/34; B01D 25/12; B01D 25/21
(Continued)

(56) References Cited

U.S. PATENT DOCUMENTS 4,749,482 A * 6/1988 Bonn .................. B01D 25/164
210/231

FOREIGN PATENT DOCUMENTS

CN   2339281 Y        9/1999
DE   10024725 A1 * 11/2001   ........... B01D 25/215
(Continued)

OTHER PUBLICATIONS

English Machine Translation of DE10024725A1 (Year: 2001).*
(Continued)

*Primary Examiner* — Madeline Gonzalez
(74) *Attorney, Agent, or Firm* — Andrus Intellectual Property Law, LLP

(57) ABSTRACT

A filter diaphragm for a horizontal plate and frame-type filter, such as a tower press, including a sheet like body and at least on a filter plate-facing side thereof, a continuous seal bead. The seal bead includes an inner seal lip on a lateral inside of the seal bead and an outer seal lip surrounding the inner seal lip on a lateral outside of the seal bead. The outer seal lip is elevated from the inner seal lip in a vertical direction perpendicular to a general plane defined by the diaphragm.

16 Claims, 2 Drawing Sheets

(51) Int. Cl.
*B01D 25/21* (2006.01)
*B01D 35/14* (2006.01)

(58) Field of Classification Search
USPC .............. 210/224–232, 450, 346, 331, 486
See application file for complete search history.

(56) References Cited

FOREIGN PATENT DOCUMENTS

| EP | 0827766 A1 | 3/1998 |
| JP | S53102174 U | 8/1978 |
| JP | 2005144393 A | 6/2005 |
| WO | 2004067140 A1 | 8/2004 |

OTHER PUBLICATIONS

International Search Report and Written Opinion for PCT Application No. PCT/FI2020/050254 mailed Sep. 21, 2020.
Office Action for Argentinian Patent Application No. 20210101017, dated Dec. 17, 2024, received Feb. 27, 2025.

* cited by examiner

FILTER DIAPHRAGM FOR A HORIZONTAL PLATE AND FRAME-TYPE FILTER, SUCH AS A TOWER PRESS

CROSS-REFERENCE TO RELATED APPLICATIONS

This application is the U.S. national stage application of International Application PCT/FI2020/050254, filed Apr. 17, 2020, which international application was published on Oct. 21, 2021, as International Publication WO 2021/209679 A1 in the English language.

FIELD OF THE DISCLOSURE

The present disclosure relates to a horizontal plate and frame-type filter, such as a tower press. More particularly, the present disclosure concerns a sealing arrangement on a diaphragm of such a filter.

BACKGROUND OF THE DISCLOSURE

In horizontal plate and frame-type filters, such as tower presses, a horizontally extending filter chamber is formed between adjacent plate frame assemblies, comprising a filter frame and a filter plate, in which a filter diaphragm is provided. The diaphragm is typically attached to the filter frame at the periphery thereof, and is clamped against the filter plate so as to seal a space formed between the filter diaphragm and the filter plate.

When in use, the space between the filter diaphragm may be provided with a pressurized medium to push the diaphragm against a filter cake formed in the filter chamber and to squeeze remaining liquid contents from the filter cake. Moreover, an underpressurized medium may be provided within the space between the filter diaphragm and the filter plate when adjacent filter frame assemblies are space apart from each other (i.e. the filter chamber is opened) during filter cake removal. This is done to prevent the filter diaphragm from hanging out in the space between the adjacent filter frame assemblies in the way of the filter cake being discharged.

However, improper use or a malfunction of the filter apparatus may cause a pressurized medium to be introduced between the diaphragm and the plate when the adjacent frame assemblies are spaced apart from each other. This may further lead to the filter diaphragm excessively inflating into the space between the spaced apart adjacent filter frame assemblies which, in turn, may cause damage to the filter diaphragm, or even a catastrophic failure thereof leading to an explosion. This is considered a serious a risk of injury to operating personnel in the vicinity of the filter apparatus.

BRIEF DESCRIPTION OF THE DISCLOSURE

An object of the present disclosure is to provide a filter diaphragm allowing, when adjacent filter frame assemblies are spaced apart (i.e. when the filter chamber is open), prevention of accidental over pressurization of the filter diaphragm (i.e. the space between the filter diaphragm and the filter plate), while additionally allowing the filter diaphragm to be held up by an underpressure introduced between the diaphragm and the filter plate, so as facilitate discharge of the of the filter diaphragm.

The object of the disclosure is achieved by the filter diaphragm which is characterized by what is stated in the independent claim. The preferred embodiments of the disclosure are disclosed in the dependent claims.

It has been discovered that a filter frame assembly may be provided with a separate frame fixed with respect to the filter plate and a subframe with a limited vertical travel with respect to the frame and the plate, i.e., in the direction which adjacent filter frame assemblies are moved away and towards each other during opening and closing of the filter chamber, respectively.

When the diaphragm is attached to the subframe, a seal bead of the filter diaphragm is allowed to be tightly sealed against the filter plate when adjacent filter frame assemblies are pressed against each other (i.e., when the filter chamber is closed). Moreover, when the adjacent filter frame assemblies are spaced apart from each other (i.e. when the filter chamber is opened), the diaphragm's seal bead along with the subframe is allowed to drop away from the filter plate, thus disengaging the tight seal between the diaphragm and the filter plate. This prevents accidental over pressurization of the space between the diaphragm and the filter plate, when the filter chamber is open.

Furthermore, when the filter chamber is opened, holding the diaphragm up by providing an under pressurized medium into the space between the filter plate and the diaphragm is enabled by providing the diaphragm with a seal bead having an inner seal lip and an outer seal lip elevated at different heights from the plate facing-side of the diaphragm.

Furthermore, the seal lip elevated higher is configured to engage with the filter plate even when the filter chamber is opened, and the sub-frame has dropped to a lower position of its limited travel. While the higher seal lip, on its own, may be configured to provide sufficient sealing against an underpressure to hold the diaphragm up and enable discharge of the filter cake, it may simultaneously be configured to leak against an overpressure, thus preventing accidental over compression of the space between diaphragm and the filter plate, when the filter chamber is opened.

On the other hand, the lower seal lip may be configured to engage the filter plate only when the adjacent filter frame assemblies are pressed against each other (i.e., the filter chamber has been closed), thereby lifting the subframe to an upper position of its limited travel. In this way the lower seal lip together with the upper seal lip provide a sufficient sealing against a pressure prevailing in the space between the diaphragm and the filter plate required to effectively squeeze remaining liquid contents out of the filter cake.

BRIEF DESCRIPTION OF THE DRAWINGS

In the following the disclosure will be described in greater detail by means of preferred embodiments with reference to the accompanying drawings, in which FIG. 1 schematically illustrates a cross-sectional cut view of a filter diaphragm according to an embodiment the present disclosure.

DETAILED DESCRIPTION OF THE DISCLOSURE

Figure 1:
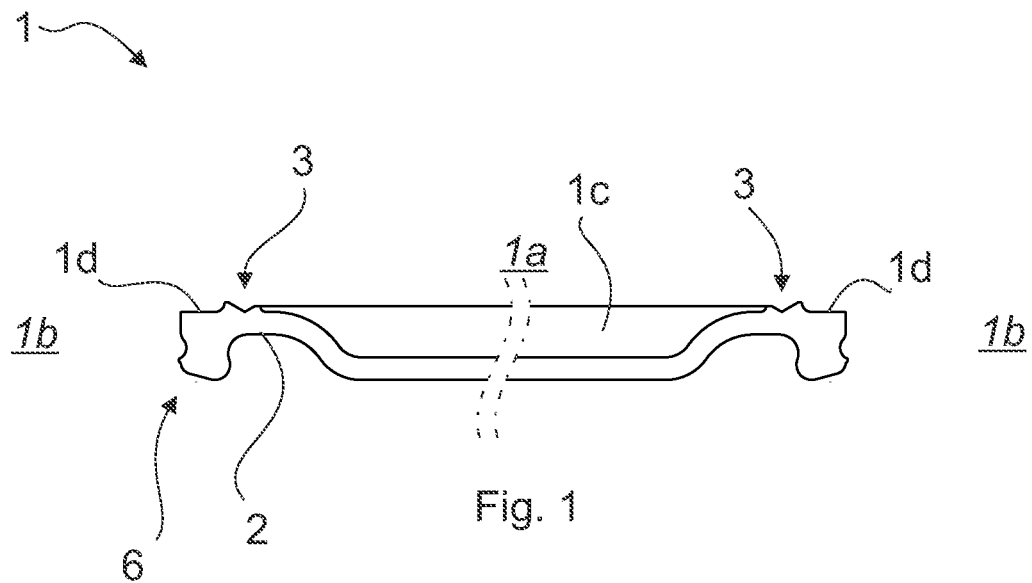
FIG. 1a is a detailed view of FIG. 1 illustrating a seal bead of the diaphragm in more detail.

According to a first aspect of the present disclosure, a filter diaphragm 1 for a horizontal plate and frame-type filter, such as a tower press, is provided.

The diaphragm 1 comprises a sheet like body 2 having a flexible structure. That is, at least a part of the body 2 of the diaphragm 1 is able to yield so as to squeeze a filter cake formed in a filter chamber without permanent deformation.

The diaphragm further comprises, at least on a filter plate-facing side 1d thereof, a continuous seal bead 3. The seal bead 3 is provided for sealing the diaphragm against a filter plate. Moreover, the seal bead delimits a planar central portion 1c of the diaphragm on a lateral inside 1a thereof. When in use, the planar central portion 1c is intended to reside within the filter chamber, and to yield without permanent deformation, so as to squeeze filter cake. A lateral outside 1b of the diaphragm 1 being defined on a side of the seal bead 3 opposite to the lateral inside 1a. Consequently, a space delimited by the seal bead 3 is formed between the diaphragm 1 and the filter plate.

The seal bead 3 comprises an inner seal lip 4 on a lateral inside 1a of the seal bead 3 and an outer seal lip 5 surrounding the inner seal lip 4 on a lateral outside 1b of the seal bead 3. Particularly, the outer seal lip 5 is elevated from the inner seal lip 4 in a vertical direction perpendicular to a general plane defined by the diaphragm 1. In the context of this disclosure, the general plane defined by the diaphragm is considered to be defined by the planarity of the central portion 1c, when laid on a flat surface.

In the context of this disclosure, the general plane defined by the diaphragm 1 is considered to be determined by the planarity of the planar central portion 1c, when laid on a flat surface.

Furthermore, the outer seal lip 5 may be configured to seal against a first pressure differential corresponding to a situation in which the space between the filter diaphragm and the filter plate is under pressurized, so as to hold the diaphragm 1 up, and further to leak under a second pressure differential corresponding to a situation in which the space between the filter diaphragm and the filter plate is over pressurized, so as to inflate the diaphragm 1.

Such a first pressure differential is conventionally much smaller than such a second pressure differential. Typically, the first pressure differential over the space between the diaphragm and the filter plate lies between 0.01-0.10 bar, while the second pressure differential between the space between the diaphragm and the filter plate is between 8-20 bar. For example, the outer seal lip 5 may be configured to leak when a pressure differential of 0.15 or higher is exerted thereover, for example when an associated frame is in its lower position and an overpressure prevails in the space between the diaphragm and the filter plate.

In an embodiment of the first aspect of the present disclosure, the outer seal lip 5 is configured to deform outwardly away from the filter plate-facing side 1d when a pressure is exerted thereon from a lateral outside 1b, and to deform inwardly towards the filter plate-facing side 1d, when a pressure is exerted thereon from a lateral inside 1a. This ensures that the outer seal lip 5 deforms so as to press even more tightly against the filter plate, when an underpressure prevails within the space between the diaphragm and the filter plate. Additionally, it allows the outer seal lip 5 to leak, when the filter chamber opened and a pressurized medium is introduced into the space between the diaphragm 1 and the filter plate, thereby preventing accidental over pressurization.

Respectively, the inner seal lip 4 is configured to deform outwardly away from the filter plate-facing side 1d when a pressure is exerted thereon from a lateral inside 1a, and to deform inwardly towards the filter plate-facing side 1d, when a pressure is exerted thereon from a lateral outside 1b. This ensures, that the inner seal lip 4 deforms so as to press even more tightly against the filter plate, when an overpressure is exerted into space between the diaphragm and the filter plate Particularly, inner seal lip 4 and the outer seal lip 5 may be configured accordingly by altering the shape and rigidity thereof.

In an embodiment according to the first aspect of the present disclosure, the outer seal lip 5 may have a first asymmetric lateral rigidity, and the inner seal leap 4 to have a second asymmetric lateral rigidity. That is, the capability of both the inner seal lip 4 and the outer seal lip 5 to resist lateral deformation (i.e., deformation in a direction planar with the general plane of the diaphragm and transverse to the longitudinal direction of the bead) is different in opposite lateral directions.

Particularly, the inner seal 4 lip may have an increased lateral rigidity against a pressure exerted from the lateral inside 1a with respect to a transversal rigidity of the inner seal lip 4 against a pressure exerted from the lateral outside 1b. That is, the inner seal 4 would be able to better resist deformation against an overpressure prevailing in the space between the diaphragm 1 and the filter plate, than an underpressure prevailing in said space.

Respectively, the outer seal lip 5 may have an increased lateral rigidity against a pressure exerted from a lateral outside 1b with respect to a transversal rigidity of the outer seal lip 5 against a pressure exerted from a lateral inside 1a. That is, the outer seal 5 would be able to better resist deformation against an underpressure prevailing in the space between the diaphragm 1 and the filter plate, than an overpressure prevailing in said space.

In an embodiment according to the first aspect of the present disclosure, the cross-sectional profile of the outer seal lip 5 defines an outer seal lip ridge 5a between a lateral outside crest 5b and a lateral intermediate crest 3a. Moreover, the cross-sectional profile of the inner seal lip 4 defines an inner seal lip ridge 4a between a lateral inside crest 4b and the lateral intermediate crest 3a.

Preferably, but not necessarily, a portion of the cross-sectional profile of the inner seal lip 4, residing on the lateral outside 1b of a vertical line 4' running through a lateral centre point of the inner seal lip ridge 4a along the direction perpendicular to the general plane of the diaphragm 1, occupies a greater space than a portion of the cross-sectional profile of the inner seal lip 4 residing on the lateral inside 1a of said line 4'. Respectively, a portion of the cross-sectional profile of the outer seal lip 5, residing on the lateral inside 1a of a vertical line 5' running through a lateral centre point of the outer seal lip ridge 5a along the direction perpendicular to the general plane of the diaphragm 1, occupies a greater space than a portion of the outer seal lip 5 residing on the lateral outside 1b of said line 5'.

This ensures that the inner seal lip 4 has more material on the lateral outside 1b thereof, enabling it to resist deformation better against a force exerted from the lateral inside 1a.

Correspondingly, the outer seal lip 5 has more material on the lateral inside 1a thereof, enabling it to resist deformation better against a force exerted from the lateral inside 1a.

Preferably, but not necessarily, the cross-sectional profile of the outer seal lip 5 has a greater inclination between the lateral outside crest 5b and the outer seal lip ridge 5a than between the lateral intermediate crest 3a and the outer seal lip ridge 5a. Respectively, the cross-sectional profile of the inner seal lip 4 has a greater inclination between the lateral inside crest 4b and the inner seal lip ridge 4a than between the lateral intermediate crest 3a and the inner seal lip ridge 4a.

Preferably, but not necessarily, an inclination at which a lateral outside wall of the outer seal lip 5 adjoins the ridge 5a thereof is greater than an inclination at which a lateral inside wall of the outer seal lip 5 adjoins the ridge 5a thereof. Respectively, an inclination at which a lateral inside wall of the inner seal lip 4 adjoins the ridge 4a thereof is greater than an inclination at which a lateral outside wall of the inner seal lip 4 adjoins the ridge 4a thereof.

In the context of this disclosure, the lateral outside wall of the outer seal lip 5 is used to describe the surface between the laterally outer crest 5b and the ridge 5a, whereas the lateral inside wall of the outer seal lip 5 is used to describe the surface between the laterally intermediate crest 3a and the ridge 5a. Correspondingly, the lateral inside wall of the inner seal lip 4 is used to describe the surface between the laterally inner crest 4b and the ridge 4a, whereas the lateral outside wall of the inner seal lip 4 is used to describe the surface between the laterally intermediate crest 3a and the ridge 4a.

Preferably, but not necessarily, outer seal lip 5 has a first height extending from the lateral intermediate crest 3a outwardly from the filter plate-facing side 1d of the diaphragm 1 in the vertical direction perpendicular to the general plane of the diaphragm 1, and the inner seal lip 4 has a second height extending from the lateral intermediate crest 3a outwardly from the filter plate-facing side 1d of the diaphragm 1 in the vertical direction perpendicular to the general plane of the diaphragm 1. Most suitably, the first height is at least 10% greater than the second height.

Alternatively, or additionally, the second height may suitably be at least 30% of the second height.

In an embodiment according to the first aspect of the present disclosure, the filter diaphragm comprises an attachment bead 6 for attaching the diaphragm 1 to correspondingly shaped groove formed on a plate frame. Particularly, the attachment bead 6 is provided on a plate frame-facing side of the diaphragm 1, opposite to the filter plate-facing side. The attachment bead 6 runs along the periphery of the filter diaphragm 1 and delimits the central 1c and preferably also the seal bead 3 on the lateral inside 1a of the attachment bead 6.

The attachment bead 6 has a cross-sectional profile having a base portion 6b attaching the bead 6 to the remaining diaphragm 1, a distal portion 6a and an intermediate 6c portion between the base portion 6b and the distal portion 6a. The laterally extending dimension W6a of the distal portion 6a exceeds that of the intermediate portion W6c. That is, in the cross-sectional profile of the attachment bead 6, a narrowed waist is formed by the intermediate portion 6c, with respect to the distal portion 6a. This enables the attachment bead 6 to be form-fittingly attached to an associated groove having a corresponding cross-sectional profile. Preferably, but not necessarily, the laterally extending dimension W6a of the distal portion 6a is defined as a maximum laterally extending dimension (i.e. width) thereof, whereas the laterally extending dimension W6c of the intermediate portion 6c is defined as a minimum laterally extending dimension (i.e. width) thereof.

The attachment bead 6 has an asymmetric cross-sectional profile with respect to a vertical asymmetry axis A6 running through a lateral centre point of a minimum width section W6min of the intermediate portion 6c.

The vertical asymmetry axis A6 is perpendicular to a general plane of the diaphragm 1, defined by a planarity of the central portion 1c, when laid on a flat surface.

The minimum width section W6min of the intermediate portion 6c is defined as a point of the cross-sectional profile of the attachment bead 6 at which the intermediate portion 6c exhibits a smallest laterally extending dimension. That is, the minimum width section W6min is defined at the most narrow point of the intermediate portion 6c, i.e., at a point having the smallest dimension of the intermediate portion 6c along a horizontal direction, transverse to the running direction of the attachment bead 6 and parallel with the general plane of the diaphragm 1.

Moreover, the distal portion 6a extends laterally further from the asymmetry axis A6 on the lateral outside 1b than on the lateral inside 1a of the attachment bead 6.

The above described arrangement ensures that, when inserted into a corresponding groove, the attachment bead 6 of the diaphragm 1 is able to better resist torsion caused by the weight of (or force exerted on) the central portion 1c, thus pulling the attachment bead 6 out of the groove. More precisely, the weight of the central portion 1c strives to pivot the distal portion 6a towards the lateral outside 1b and up away from a bottom of an associated groove about a pivot point formed on a lateral inside of an aperture portion of the groove. As the distal portion 6a extends laterally further away from the asymmetry axis A6, the mutually corresponding, form fitting shapes of the attachment bead 6 and the groove counteracts the torsion and pivoting of the bead 3, thereby improving secure attachment between the diaphragm 1 and the associated frame 4.

It is particularly important for proper functioning of the inner seal lip 4 and the outer seal lip 5 that the diaphragm is held securely in pace and maintained with its intended orientation with respect to the filter plate frame and the filter plate.

In a variant of this embodiment, the cross-sectional profile of the attachment bead 6 may be arranged asymmetric at the intermediate portion 6c with respect to the vertical asymmetry axis A6.

Preferably, but not necessarily, an asymmetric concavity, with respect to the asymmetry axis A6, is provided on the intermediate portion 6c of the cross-sectional profile of the attachment bead 6. That is, a curved indentation towards the asymmetry axis A6 is provided at the intermediate portion 6c. For example, a concavity may be provided on only on the lateral outside of the attachment bead. If a concavity is provided on both the lateral inside 1a and the lateral outside 1b, they may be positioned at different vertical positions on and/or have different curvatures (e.g., different radii of the curvatures)

More preferably, but not necessarily, a concavity having a curvature with a smaller radius is exhibited on the lateral outside 1b than on the lateral inside 1a, if any. This further improves the capability of the mutual forms of the attachment bead 6 and the groove to arrest the attachment bead 6 in place against the torsion and pivoting caused by the weight of the central portion 1c, as discussed above.

In a variant of this embodiment, the cross-sectional profile of the bead 6 is asymmetric at the distal portion 6a with respect any to vertical line running through the bead 6. Most suitably, the cross-sectional profile of the bead 6 is asymmetric at the distal portion 6a with respect to the asymmetry axis A6

In a variant of this embodiment, an asymmetric bulge 6d (i.e., a protuberance protruding from a surrounding curvature in the cross-sectional profile of the attachment bead 6), with respect to the asymmetry axis A6, is provided on the distal portion 6a of the cross-sectional profile of the bead 6. Preferably but not necessarily, such a bulge is provided only on the lateral outside 1b of the distal portion 6a.

This further improves the capability of the mutual forms of the bead and the groove to arrest the bead in place against the torsion and pivoting caused by the weight of the central portion 1c, as discussed above.

In an variant of this embodiment, a distal surface 6a' of the distal portion is inclined with respect to the general plane of the diaphragm 1, such that the distal surface 6a' is inclined towards the intermediate portion 6c in a direction from the lateral inside 1a towards the lateral outside 1b. Again, this is considered to further improve the capability of the mutual forms of the bead 6 and the correspondingly shaped groove to arrest the bead in place against the torsion and pivoting caused by the weight of the central portion 1c, as discussed above.

In a variant of this embodiment, a contour of the cross-sectional profile of the bead 6 is differentiable at each point thereof. That is, the curvature of the bead's 6 cross-sectional profile is smooth with no sharp points.

This ensures that no excessively concentrated regions of internal stresses are formed on the correspondingly formed groove.

It should be noted that the disclosure encompasses any combination of two or more embodiments, or variants thereof, of the first aspect, as discussed above.

FIG. 1 schematically illustrates a cross-sectional cut view of a filter diaphragm 1 according to an embodiment the present disclosure. On the filter plate-facing side 1d of the filter body 2 seal bead 3 is provided for sealing against a filter plate, thereby delimiting a 1 planar central portion 1c on the lateral inside 1a sealable from the lateral outside.

Figure 1A:
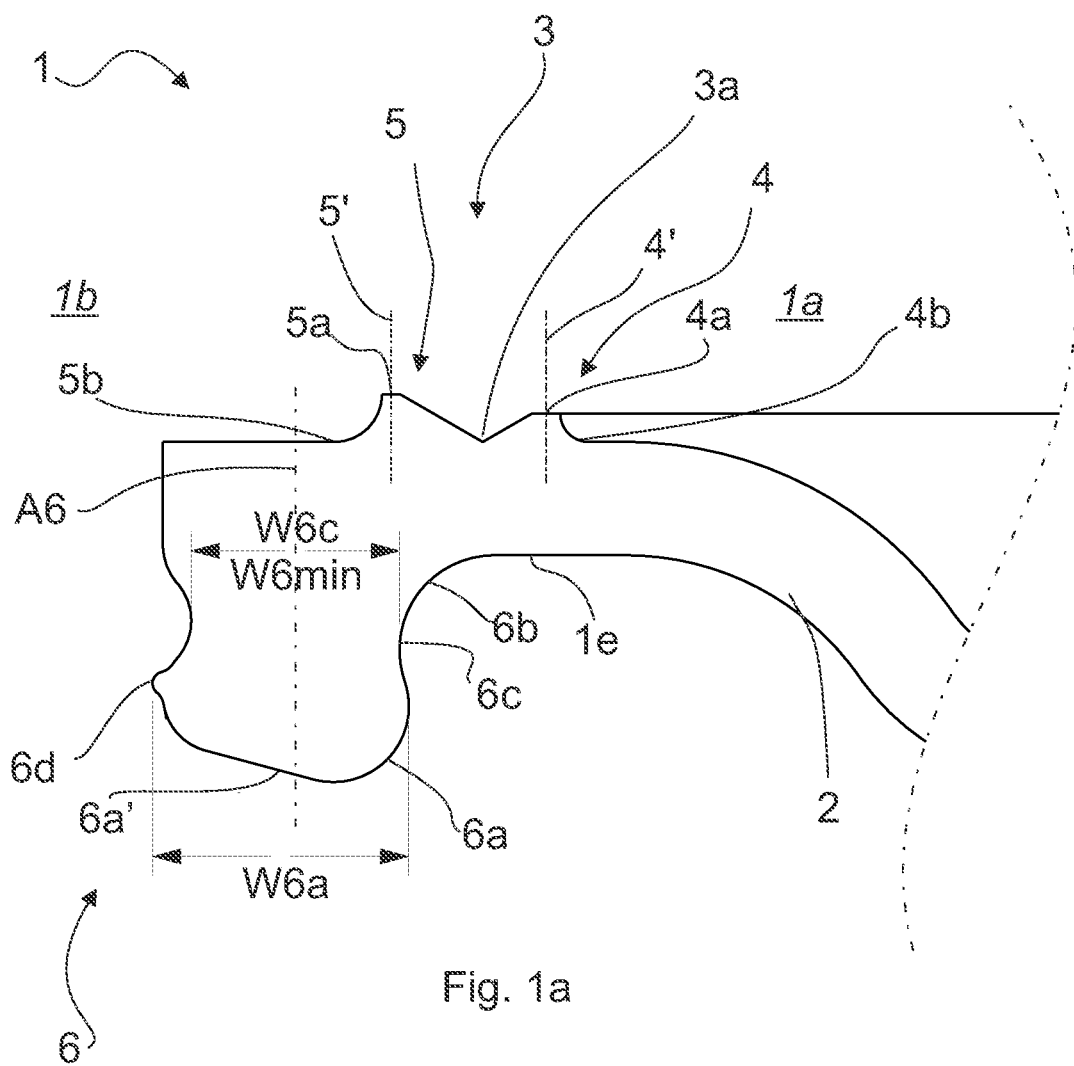

FIG. 1a is a detailed view of FIG. 1 illustrating the seal bead 3 of the diaphragm in more detail. The seal bead comprises an inner seal lip 4 on the lateral inside 1a of the bead, and outer seal lip 5 on the lateral outside 1b of the bead. Particularly, the outer seal lip 5 is elevated higher from the filter plate-facing side 7a than the inner seal lip 4.

The outer seal lip 5 has a ridge 5a between a laterally outer crest 5b and a laterally intermediate crest 3a, whereas the outer seal lip 5 has a ridge 5a between the laterally inner crest 5b and the laterally intermediate crest 3a. A vertical line running through a lateral centre-point of the inner seal lip ridge 4a is denoted with reference numeral 4'. Correspondingly, a vertical line running through a lateral centre point of the outer seal lip ridge 5a is denoted with reference numeral 5'.

The amount of matter residing on different sides of the line 5', and also the shape of the outer seal lip 5 and the inclination of its side walls have been configured such that the outer seal lip 5 is self-sealing against and is able to better resist deformation against a pressure exerted from a lateral outside 1b, and is not self-sealing and is less able to resist deformation against a pressure exerted from a lateral inside 1a. Correspondingly, the amount of matter residing on different sides of the line 4', and also the shape of the inner seal lip 4 and the inclination of its side walls have been configured such that the inner seal lip 4 is self-sealing against and is able to better resist deformation against a pressure exerted from a lateral inside 1a, and is not self-sealing and is less able to resist deformation against a pressure exerted from a lateral outside 1b.

Moreover, FIG. 1a illustrates the asymmetric attachment bead 6, in which the distal portion 6a extends further from the asymmetry axis A6 on the lateral outside 1b of the attachment bead 6 than on the later inside 1a. A narrowed waist is formed by the intermediate portion 6c, with respect to the distal portion 6a. Furthermore, an asymmetric bulge 6d is exhibited at the distal portion 6a on the lateral outside 1b, whereas no such bulge is exhibited on the lateral inside 1a. Also, the lateral surface 6a' is inclined.

Figure 2:
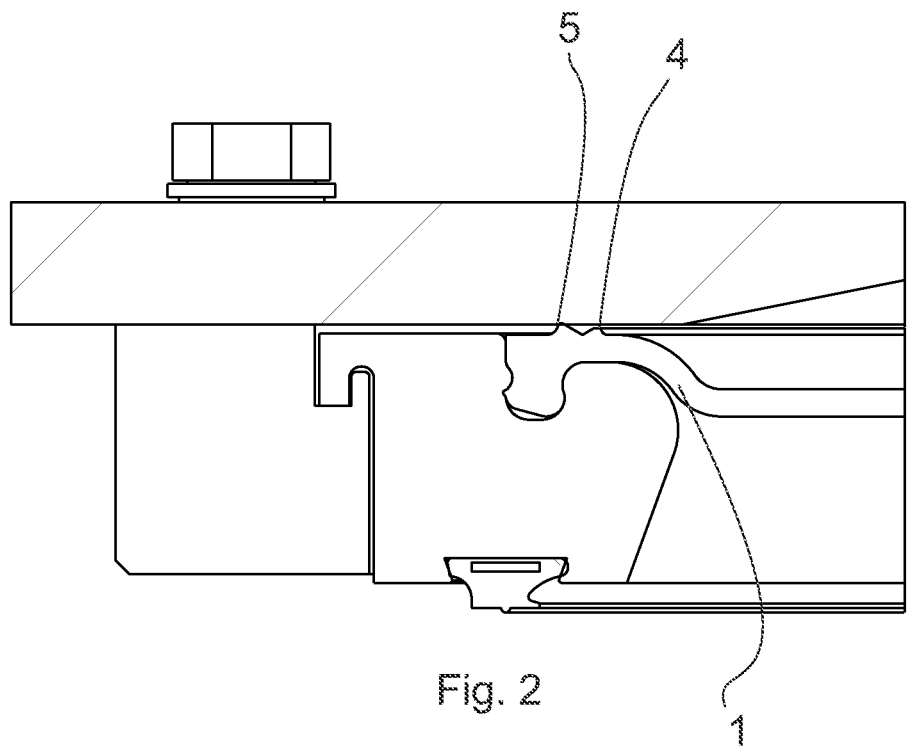
FIG. 2 schematically illustrates the filter diaphragm of FIG. 1 in a filter frame assembly when adjacent filter frame assemblies are spaced apart from each other, and FIG. 3 schematically the filter frame assembly of FIG. 2 when adjacent filter frame assemblies are pressed against each other.

FIG. 2 schematically illustrates the filter diaphragm of FIG. 1 in a filter frame assembly when adjacent filter frame assemblies are spaced apart from each other. The filter frame assembly comprises a subframe, onto a profiled groove of which the filter diaphragm is attached to with a correspondingly profiled bead (on the side opposite to the filter plate-facing side). The filter subframe, in turn, is attached to a filter frame in a manner allowing a limited vertical travel. The filter frame, in turn is fixed with respect to filter plate, against which the outer seal 5 engages. FIG. 2 illustrates the subframe in a bottom position of its limited vertical travel, corresponding to a situation in which adjacent filter plates are spaced apart from each other (i.e. the filter chamber is opened). In this position, the only the outer seal lip 5 engages against the filter plate. This allows an underpressure to be exerted into the space between the diaphragm 1 and the filter plate, thereby lifting the central portion 1c of the diaphragm up so as to facilitate removal of the filter cake from the filter chamber. Moreover, as only the outer seal lip 5 is engaged against the filter plate, accidental over pressurization of the space between the diaphragm and the filter plate would cause the outer seal lip 5 to leak, thus preventing the overpressure from excessively inflating the diaphragm.

Figure 3:
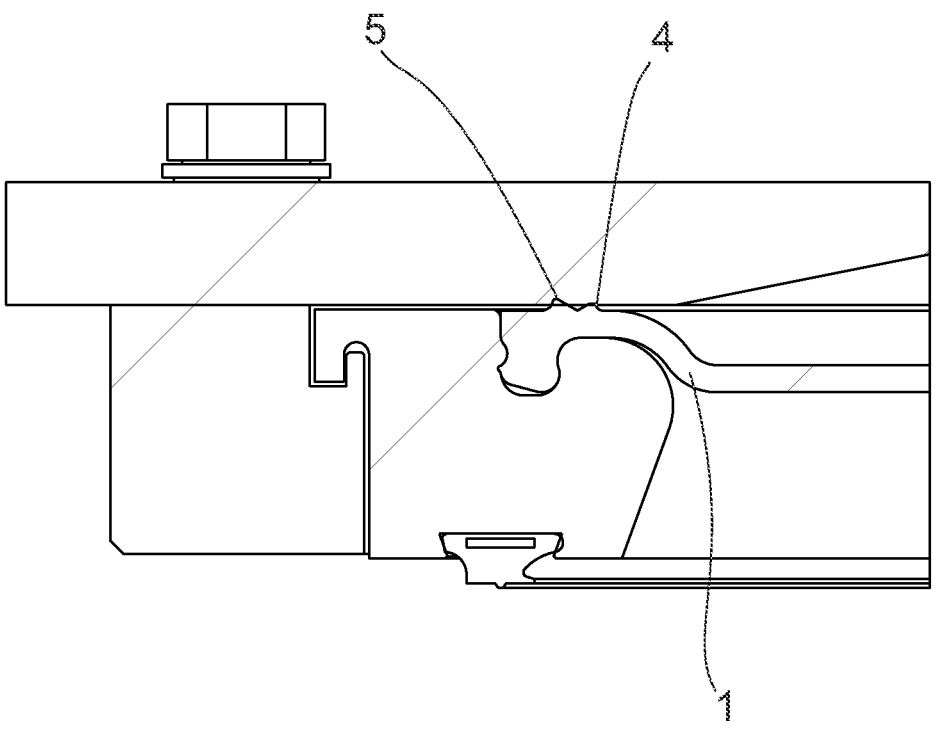

FIG. 3 schematically the filter frame assembly of FIG. 2 when adjacent filter frame assemblies are pressed against each other (i.e., when the filter chamber is closed. In this situation a filter plate of an adjacent filter plate below that of FIG. 3 pushes the subframe upwards to a top position of its limited travel. Consequently, both the outer seal lip 5 and the inner seal lip 4 are engaged against the filter plate. As a result, a sufficient overpressure can be introduced into the space between the diaphragm 1 and the filter plate, so as to squeeze remaining liquid contents out of a filter cake.

LIST OF REFERENCE NUMERALS 1 filter diaphragm
1a lateral inside of filter diaphragm
1b lateral outside of filter diaphragm
1c planar central portion of filter diaphragm
1d filter plate-facing side of diaphragm
1e plate frame-facing side of diaphragm
2 body of filter diaphragm
3 seal bead
3a laterally intermediate crest
4 inner seal lip
4a inner seal lip ridge
4b laterally inner crest
5 outer seal lip
5a outer seal lip ridge
5b laterally outer crest
6 attachment bead
6a distal portion of attachment bead
6a' distal surface of attachment bead
6b base portion of attachment bead 6c intermediate portion of attachment bead
6d asymmetric bulge
W6a laterally extending dimension of distal portion
W6c laterally extending dimension of intermediate portion
A6 vertical asymmetry axis of attachment bead
W6min minimum width section of the intermediate portion

The invention claimed is:

1. A filter diaphragm for a horizontal plate and frame-type filter including a filter plate and a plate frame, comprising:
   a sheet like body having a flexible structure, the body having a filter plate-facing side and a plate frame-facing side opposite the filter plate-facing side;
   a continuous seal bead on the filter plate-facing side of the body; and
   an attachment bead on a plate frame-facing side of the body, opposite to the filter plate-facing side, the attachment bead for attaching the diaphragm to a correspondingly shaped groove formed on the plate frame,
   wherein the seal bead delimits a planar central portion of the diaphragm on a lateral inside thereof, a lateral outside of the diaphragm being defined on a side of the seal bead opposite to the lateral inside,
   wherein the seal bead comprises an inner seal lip on a lateral inside of the seal bead and an outer seal lip surrounding the inner seal lip on a lateral outside of the seal bead, wherein the inner seal lip and the outer seal lip are configured to engage the filter plate,
   wherein the outer seal lip is elevated from the inner seal lip in a vertical direction perpendicular to a general plane defined by the diaphragm.

2. The filter diaphragm according to claim 1, wherein the outer seal lip is configured to deform outwardly away from the filter plate-facing side when a pressure is exerted thereon from a lateral outside, and to deform inwardly towards the filter plate-facing side, when a pressure is exerted thereon from a lateral inside, and
   wherein the inner seal lip is configured to deform outwardly away from the filter plate-facing side when a pressure is exerted thereon from a lateral inside, and to deform inwardly towards the filter plate-facing side, when a pressure is exerted thereon from a lateral outside.

3. The filter diaphragm according to claim 1, wherein, the outer seal lip has a first asymmetric lateral rigidity, and the inner seal leap has a second asymmetric lateral rigidity,
   wherein the inner seal lip has an increased lateral rigidity against a pressure exerted from the lateral inside with respect to a transversal rigidity of the inner seal lip against a pressure exerted from the lateral outside, and
   wherein the outer seal lip has an increased lateral rigidity against a pressure exerted from a lateral outside with respect to a transversal rigidity of the outer seal lip against a pressure exerted from a lateral inside.

4. The filter diaphragm according to claim 1, wherein a cross-sectional profile of the outer seal lip defines an outer seal lip ridge extending past and between an outside crest and an intermediate crest, and a cross-sectional profile of the inner seal lip defines an inner seal lip ridge extending past and between an inside crest and the intermediate crest.

5. The filter diaphragm according to claim 4, wherein a portion of the cross-sectional profile of the inner seal lip, residing on a lateral outside of a vertical line running through a lateral center point of the inner seal lip ridge along the direction perpendicular to the general plane of the diaphragm, occupies a greater space than a portion of the cross-sectional profile of the inner seal lip residing on a lateral inside of said line, and
   in that a portion of the cross-sectional profile of the outer seal lip, residing on a lateral inside of a vertical line running through a lateral center point of the outer seal lip ridge along the direction perpendicular to the general plane of the diaphragm, occupies a greater space than a portion of the outer seal lip residing on a lateral outside of said line.

6. The filter diaphragm according to claim 4, wherein the cross-sectional profile of the outer seal lip has a greater inclination between the outside crest and the outer seal lip ridge than between the intermediate crest and the outer seal lip ridge, and
   in that the cross-sectional profile of the inner seal lip has a greater inclination between the inside crest and the inner seal lip ridge than between the intermediate crest and the inner seal lip ridge.

7. The filter diaphragm according to claim 4, wherein an inclination at which a lateral outside wall of the outer seal lip adjoins the outer seal lip ridge is greater than an inclination at which a lateral inside wall of the outer seal lip adjoins the outer seal lip ridge, and
   in that an inclination at which a lateral inside wall of the inner seal lip adjoins the inner seal lip ridge is greater than an inclination at which a lateral outside wall of the inner seal lip adjoins the inner seal lip ridge.

8. The filter diaphragm according to claim 4, wherein the outer seal lip has a first height extending from the intermediate crest outwardly from the filter plate-facing side of the diaphragm in the direction perpendicular to the general plane of the diaphragm, and the inner seal lip has a second height extending from the intermediate crest outwardly from the filter plate-facing side of the diaphragm in the direction perpendicular to the general plane of the diaphragm, and
   wherein the first height is at least 10% greater than the second height.

9. The filter diaphragm according to claim 4, wherein the outer seal lip has a first height extending from the intermediate crest outwardly from the filter plate-facing side of the diaphragm in the direction perpendicular to the general plane of the diaphragm, and the inner seal lip has a second height extending from the intermediate crest outwardly from the filter plate-facing side of the diaphragm in the direction perpendicular to the general plane of the diaphragm, and
   wherein the second height is at least 30% of the first height.

10. The filter diaphragm according to claim 1, wherein the attachment bead runs along the periphery of the filter diaphragm and delimits the central portion of the diaphragm on an lateral inside of the attachment bead,
   wherein the attachment bead has a cross-sectional profile having base portion attaching the attachment bead to the remaining diaphragm, a distal portion and an intermediate portion between the base portion and the distal portion, such that a laterally extending dimension of the distal portion exceeds that of the intermediate portion,
   wherein the attachment bead has an asymmetric cross-sectional profile with respect to a vertical asymmetry axis running through a lateral center point of a minimum width section of the intermediate portion,
   wherein the vertical asymmetry axis is perpendicular to a general plane of the diaphragm, defined by a planarity of the central portion, when laid on a flat surface,
   wherein the minimum width section of the intermediate portion being defined as a point of the cross-sectional profile of the attachment bead at which the intermediate portion exhibits a smallest laterally extending dimension, and wherein the distal portion extends laterally further from the asymmetry axis on the lateral outside than on the lateral inside.

11. The filter diaphragm according to claim 10, wherein the cross-sectional profile of the attachment bead is asymmetric at the intermediate portion with respect to the vertical asymmetry axis.

12. The filter diaphragm according to claim 11, wherein an asymmetric concavity, with respect to the asymmetry axis, is provided on the intermediate portion of the cross-sectional profile of the attachment bead.

13. The filter diaphragm according to claim 10, wherein the cross-sectional profile of the attachment bead is asymmetric at the distal portion with respect to any vertical line running through the attachment bead.

14. The filter diaphragm according to claim 10, wherein an asymmetric bulge, with respect to the asymmetry axis, is provided on the distal portion of the cross-sectional profile of the bead.

15. The filter diaphragm according to claim 10, wherein a distal surface of the distal portion is inclined with respect to the general plane of the diaphragm, such that the distal surface is inclined towards the intermediate portion in a direction from the lateral inside towards the lateral outside.

16. The filter diaphragm according to claim 10, wherein a contour of the cross-sectional profile of the attachment bead is differentiable at each point thereof.

* * * * *